United States Patent
Yamazaki et al.

[11] Patent Number: 5,398,007
[45] Date of Patent: Mar. 14, 1995

[54] LOW-POWER BAUD RATE GENERATOR INCLUDING TWO OSCILLATORS

[75] Inventors: Seiichi Yamazaki; Sumihiro Takashima, both of Tokyo, Japan

[73] Assignee: Oki Electric Industry Co., Ltd., Tokyo, Japan

[21] Appl. No.: 277,704

[22] Filed: Jul. 20, 1994

Related U.S. Application Data

[63] Continuation of Ser. No. 127,871, Sep. 28, 1993, abandoned.

[30] Foreign Application Priority Data

Sep. 29, 1992 [JP] Japan .................................. 4-259455

[51] Int. Cl.6 .............................................. H03L 7/00
[52] U.S. Cl. ........................................ 331/46; 331/48; 327/114; 327/115
[58] Field of Search ............... 331/46, 47, 48; 328/63, 328/72, 73, 74

[56] References Cited

U.S. PATENT DOCUMENTS 4,305,041 12/1981 Frerking ........................ 328/63 X

FOREIGN PATENT DOCUMENTS

0052884A1 6/1982 European Pat. Off. .
0315260A3 5/1989 European Pat. Off. .
0315260A2 5/1989 European Pat. Off. .
2261239 10/1990 Japan .

Primary Examiner—Siegfried H. Grimm
Attorney, Agent, or Firm—Edward D. Manzo; Ted K. Ringsred

[57] ABSTRACT

A baud rate generator has a first oscillator that generates a first clock signal, and a second oscillator that generates a second clock signal with higher frequency but lower frequency accuracy. The first oscillator employs an external resonator but the second does not. The baud rate generator uses the first clock signal to measure the frequency of the second clock signal, then determines a division ratio by which to divide the frequency of the second clock signal, then divides the second clock signal by this division ratio to generate a crock signal for use in serial communication.

29 Claims, 5 Drawing Sheets

LOW-POWER BAUD RATE GENERATOR INCLUDING TWO OSCILLATORS

This is a continuation of application Ser. No. 08/127,871, filed on Sep. 28, 1993, and now abandoned.

BACKGROUND OF THE INVENTION

This invention relates to a baud rate generator for generating a serial communication clock signal, more particularly to a baud rate generator suitable for integration into a low-power microcontroller.

Microcontrollers (also referred to as single-chip microcomputers) serve as embedded controllers in products spanning the range from electronic toys to large-scale industrial equipment. Many microcontrollers communicate with other electronic devices by means of a built-in serial communication port. In the commonly-employed asynchronous communication mode, the port transmits and receives data at a standard rate such as 300, 600, 1200, 2400, or 9600 bits per second (bps), referred to as a baud rate. This requires the microcontroller to generate a clock signal, referred to as a serial clock, with a frequency preferably within one per cent of the desired baud rate. Microcontrollers that operate on a stable system clock generated by an external crystal resonating at a high frequency such as 10 MHz can easily generate the required serial clock by dividing the system clock frequency. For a 9600-bps baud rate, for example, it suffices to divide 10 MHz by 1042, obtaining 9597 Hz, which differs from 9600 Hz by only about 0.03%.

Microcontrollers in some devices, however, must operate with very low current and power consumption, which entails running the microcontroller at a much slower system clock speed. The system clock of such a low-power microcontroller is typically generated by a crystal resonating at 32,768 Hz, the rate of the crystals employed in electronic wrist watches. This system clock frequency cannot be divided to obtain the higher baud rates mentioned above (1200, 2400, or 9600 bps) without incurring considerable frequency error. For example, the closest approximation to 9600 bps is obtained by dividing 32,768 Hz by three, but that gives 10,923 Hz, which is obviously unacceptable: the frequency error exceeds thirteen per cent.

One possible solution to this problem is to use only a slower baud rate such as 300 or 600 bps, but this is too slow for many applications.

Another possible solution is to use a high-frequency external crystal resonator, the frequency of which is divided to obtain both the necessary lower system clock frequency and the still-lower baud rate. Use of a high-frequency resonator, however, exacts a stiff power and current penalty: current consumption rises from several microamperes to several milliamperes.

Yet another possible solution is to provide the microcontroller with two external crystals, one resonating at a low frequency to generate the system clock, and another resonating at a high frequency which is divided to generate the baud rate. The high-frequency crystal is activated only when serial communication is performed. This solution is unsatisfactory, however, because it increases the number of external components and adds significantly to the cost of the microcontroller system.

SUMMARY OF THE INVENTION

It is accordingly an object of the present invention to generate accurate baud rates for serial communication in a microcontroller running at a low system clock frequency, without restricting communication to low baud rates, drawing extra current and power, or requiring an extra external resonator.

The invented baud rate generator employs a first oscillator circuit to generate a first clock signal (the system clock) and a second oscillator circuit to generate a second clock signal having a higher frequency, but lower frequency accuracy, than the first clock signal. The first clock signal is counted to determine a first interval of time. The second clock signal is counted during this interval to obtain a count value. The count value is then divided by a certain integer, preferably a power of two, to obtain a division ratio. The frequency of the second clock signal is divided by this division ratio to generate a clock signal for serial communication at the desired baud rate.

DETAILED DESCRIPTION OF THE INVENTION

An embodiment of the invention will be described with reference to the attached drawings. These drawings illustrate the invention but do not restrict its scope, which should be determined solely from the appended claims.

Figure 1:
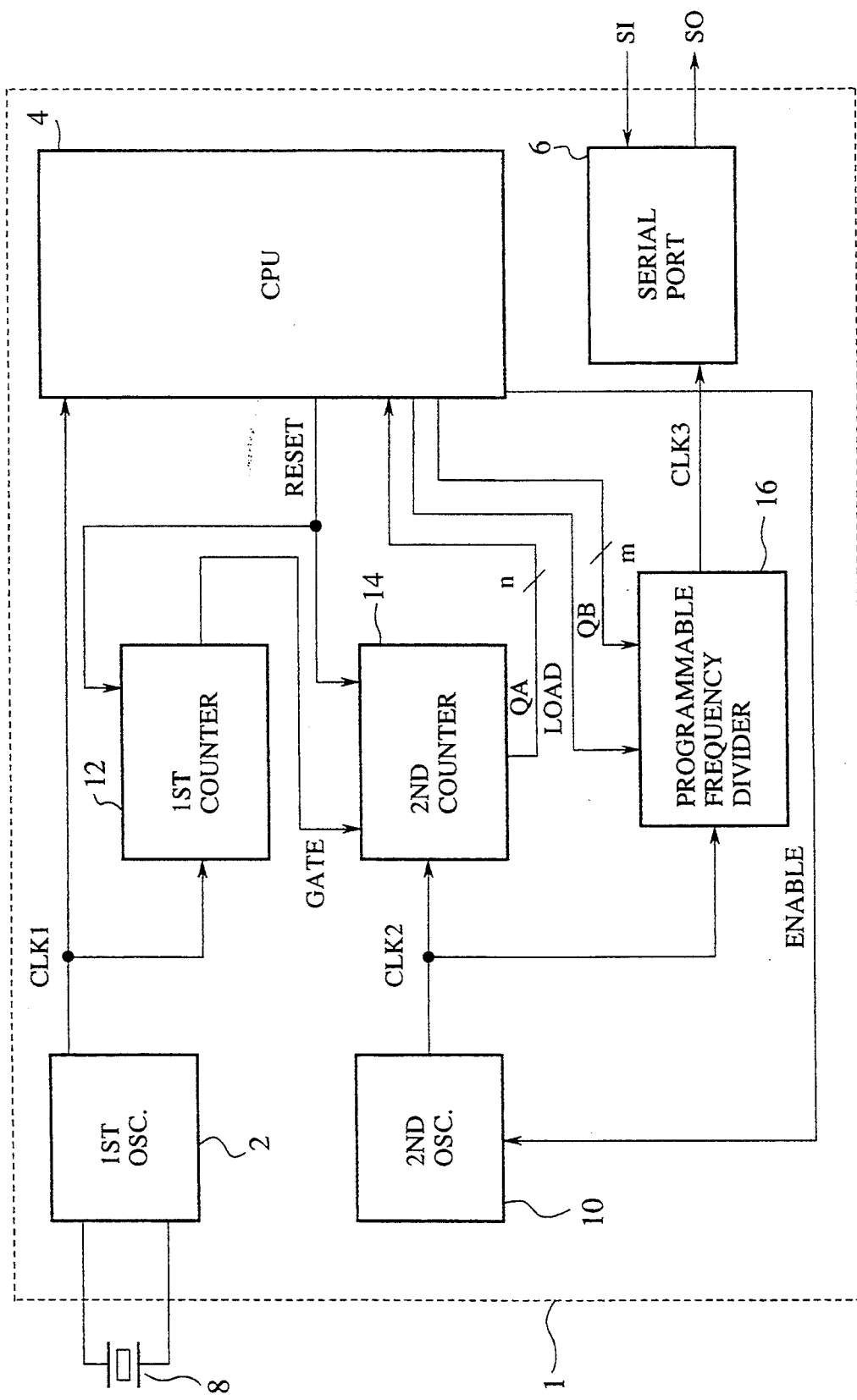
FIG. 1 is a block diagram of the invented baud rate generator.

FIG. 1 shows a microcontroller 1 comprising a first oscillator 2, a central processing unit (CPU) 4, and a serial port 6. The first oscillator 2 is coupled to an external resonator 8 such as a crystal that resonates at an accurate frequency $f_1$ of 32,768 Hz. This enables the first oscillator 2 to generate a first clock signal CLK1 having the same frequency $f_1$. This first clock signal CLK1 is a system clock signal that is supplied to the CPU 4 as a basic operating signal.

The serial port 6 communicates with other devices (not shown in the drawing) by means of a serial input signal SI and a serial output signal SO. The bit rate of the signals SI and SO is equal to one of the standard frequencies used in serial communication. In the subsequent description this frequency $f_s$ will be assumed to be 9600 Hz; that is, the serial port 6 communicates at a baud rate of 9600 bps. To generate this baud rate, the microcontroller 1 also comprises a second oscillator 10, a first counter 12, a second counter 14, and a programmable frequency divider 16.

The second oscillator 10 is a comparatively simple circuit such as a resistor-capacitor (RC) oscillator. A circuit diagram will be shown later. The second oscillator 10 oscillates at a higher Frequency than the first oscillator 2, but with lower frequency accuracy and lower stability. It is not coupled to an external resonator. The second oscillator 10 is controlled by an enable signal (ENABLE) output by the CPU 4, and oscillates only when ENABLE is active. The output of the second oscillator 10 is a second clock signal CLK2 with a frequency $f_2$, which is higher than $f_1$.

The first counter 12 is coupled to the first oscillator 2, from which it receives the first clock signal CLK1, and the CPU 4, from which it receives a reset signal (RESET). After being reset, the first counter 12 outputs an active gate signal (GATE) and begins counting cycles of CLK1. When it has counted a certain number $N_1$ of these CLK1 cycles, the first counter 12 deactivates the GATE signal. The first counter 12 can be configured as either an up-counter or a down-counter, with additional logic circuits as necessary to produce the GATE signal. The value of $N_1$ can be hard-wired into the first counter 12, or it can set by the CPU 4. Different $N_1$ values can be set for different baud rates.

The number $N_1$ is preferably of the following form:

$$N_1 = 2^x(f_1/f_s)$$

where x is a positive integer and $f_1$ and $f_s$ are as above. If x=7, for example, then since $2^7 = 128$, $N_1$ is:

$$N_1 = 128 \times 32{,}768/9600 = 436.90666.$$

Since $N_1$ must be an integer it is rounded off to 437.

The second counter 14 is an up-counter that is reset to zero by the RESET signal output by the CPU 4, receives the second clock signal CLK2 from the second oscillator 10, and counts CLK2 cycles while the GATE signal output by the first counter 12 is active. The second counter 14 is an n-bit binary counter, the n-bit value of which can be read by the CPU 4 via an n-bit signal line QA (here n is an appropriate positive integer). The count value left in the second counter 14 when the GATE signal becomes inactive will be denoted $N_2$.

The programmable frequency divider 16 receives two signals from the CPU 4: a division ratio $N_3$ which it receives as an m-bit binary signal via a signal line QB, and a load signal (LOAD). It also receives the second clock signal CLK2 from the second oscillator 10. When the LOAD signal becomes active, the programmable frequency divider 16 loads the value $N_3$ on the QB signal line into an internal register (not shown in the drawing). Thereafter it divides the frequency $f_2$ of the CLK2 signal by $N_3$ to generate a third clock signal CLK3 with a frequency of $f_2/N_3$.

Next the operation will be explained with reference to FIGS. 2, 3, and 4.

Figure 2:
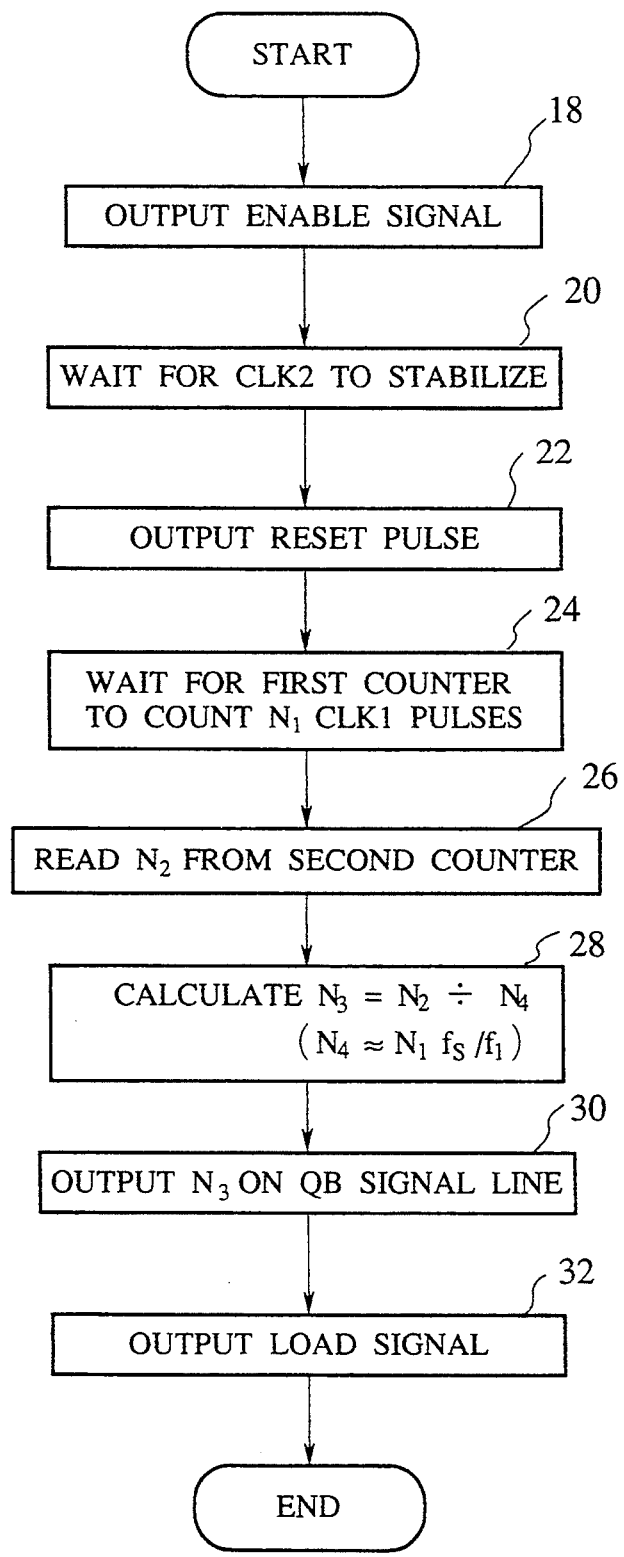
FIG. 2 is a flowchart illustrating the operation of the central processing unit in FIG. 1.

FIG. 2 is a flowchart illustrating the operation of the CPU 4. In the first step 18, before beginning serial communication, the CPU 4 outputs a high ENABLE signal to start the second oscillator 10. Then in the next step 20 it waits a certain time for the second clock signal CLK2 to settle into steady oscillation. This time can be measured by a software timing loop running in the CPU 4, or by using the first counter 12 or another counter to count an appropriate number of cycles of the first clock signal CLK1.

At the end of this time, in the next step 22 the CPU 4 generates a RESET pulse that resets the first and second counters 12 and 14. Then in the next step 24 the CPU 4 waits for the first counter 12 to count $N_1$ cycles of the first clock signal CLK1. The CPU 4 can learn when the first counter 12 has counted $N_1$ cycles by reading the count value in the first counter 12, or the first counter 12 can notify the CPU 4 by means of an interrupt, using a signal line not shown in the drawing.

In the next step 26 the CPU 4 reads the contents $N_2$ of the second counter 14 to find out how many CLK2 cycles occurred while the first counter 12 was counting $N_1$ CLK1 cycles. Then in the next step 28 the CPU 4 calculates the division ratio $N_3$ by dividing $N_2$ by an integer $N_4$. This integer $N_4$ is substantially equal to $$N_1(f_s/f_1)$$

If $N_1$ is substantially equal to $2^x(f_1/f_s)$ as described above, then $N_4$ should be $2^x$. Division by a power of two can be carried out by a simple right-shift operation, as will be described later.

In the next step 30 the CPU 4 places the calculated value $N_3$ on the QB signal line. Then in the last step 32 it outputs a LOAD pulse, causing the programmable frequency divider 16 in FIG. 1 to load the value $N_3$. The programmable frequency divider 16 will then output a clock signal CLK3 with a frequency $f_2/N_3$ substantially equal to the desired baud rate $f_s$. The reason for this will be explained next.

Let tg be the time during which the GATE signal is high. This time tg is the time taken by the first counter 12 to count $N_1$ CLK1 cycles having a frequency $f_1$, from which it follows that $f_1 = N_1/tg$. Similarly, tg is the time taken by the second counter 14 to count $N_2$ CLK2 cycles having a frequency $f_2$, from which it follows that $f_2 = N_2/tg$. Therefore, since $N_4 = N_1(f_s/f_1)$, $$tg = N_1/f_1 = N_2/f_2$$

$$N_2 = N_1(f_2/f_1)$$

$$N_3 = N_2/N_4 = [N_1(f_2/f_1)]/[N_1(f_s/f_1)] = f_2/f_s$$

$$f_2/N_3 = f_s$$

The equalities in the last two lines above are only approximate, since $N_4$ is only approximately equal to $N_1(f_s/f_1)$, but the approximation is very close. For example, if the second oscillator 10 oscillates at 1 MHz, then from the above equations:

$$tg = 437/(32{,}768 \text{ Hz}) = 0.01333612 \text{ seconds}$$

$$N_2 = 437 \times (1{,}000{,}000/32{,}768) = 13{,}336$$

$$N_3 = 13{,}336/128 = 104$$

$$f_2/N_3 = 1{,}000{,}000/104 = 9615 \text{ Hz}$$

The calculations in the last three lines above have been rounded off to integers by ignoring fraction digits. The 9615-Hz frequency of the third clock signal CLK3 differs from the desired 9600 Hz by only about 0.16%, which is well within the acceptable margin of error. In general, if $f_2$ is sufficiently high, the frequency error of the third clock signal CLK3 can be kept within any desired limit.

Figure 3:
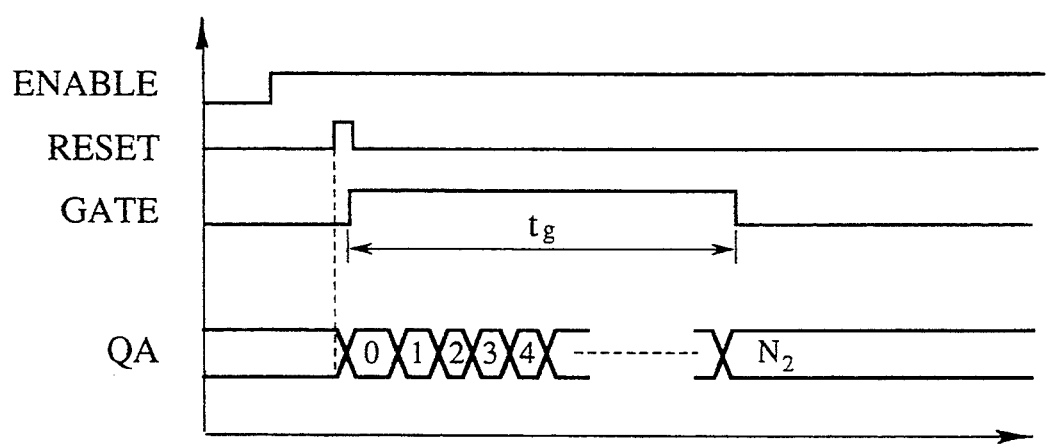
FIG. 3 is a timing diagram illustrating the operation of the first and second counters in FIG. 1.
Figure 4:
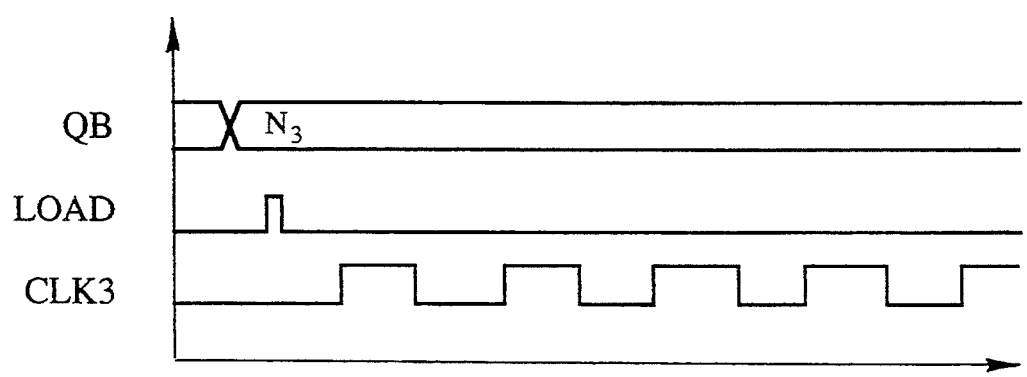
FIG. 4 is a timing diagram illustrating the operation of the programmable frequency divider in FIG. 1.

FIGS. 3 and 4 are timing charts illustrating the above operations. The ENABLE, RESET, GATE, and LOAD signals are assumed to be active high. In FIG. 3, the CPU 4 drives the ENABLE signal high, waits for CLK2 to stabilize, then outputs a high RESET pulse. The rise of the RESET signal resets the first and second counters 12 and 14. At the fall of the RESET signal the first counter 12 starts counting, the GATE signal goes high, and the second counter 14 also starts counting. When the first counter 12 has counted $N_1$ cycles of CLK1, at the end of the time interval tg, the GATE signal goes low and the second counter 14 stops counting. The count value $N_2$ of the second counter 14 can then be read by the CPU 4 on the QA signal line.

In FIG. 4, having read $N_2$, the CPU 4 calculates $N_3$ and places this value on the QB signal line, then outputs a LOAD pulse. The programmable frequency divider 16 then stores the $N_3$ value internally and uses it to divide the frequency of the second clock signal CLK2 to generate the third clock signal CLK3.

The third clock signal CLK3 in FIG. 4 can be used by the serial port 6 for timing of the serial input and output signals SI and SO. When serial communication is completed, the second oscillator 10 can be shut down by deactivating the ENABLE signal, to conserve power.

Figure 5:
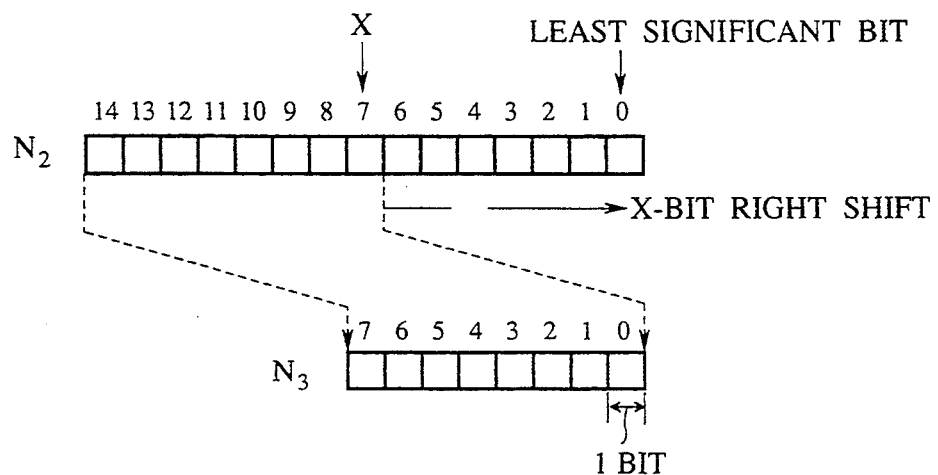
FIG. 5 is a diagram illustrating a right shift.

FIG. 5 is a diagram of the right-shift operation the CPU 4 uses to divide $N_2$ by $N_4$ when $N_2$ is a fifteen-bit binary value and $N_4$ is $2^x = 2^7 = 128$. The bit positions in $N_2$ are numbered from 14 to 0, with bit 0 being the least significant bit. It is well known that a one-bit right shift of a binary number is equivalent to dividing the number by two, in the same way that shifting the digits of an ordinary base-ten number one place to the right is equivalent to dividing by ten. A seven-bit right shift is therefore equivalent to dividing by $2^7 = 128$. To calculate $N_3 = N_2/N_4$, the CPU 4 accordingly performs a seven-bit right shift: bit 7 of $N_2$ becomes bit 0 of $N_3$, and bit 14 of $N_2$ becomes bit 7 of $N_3$. Bits 0 to 6 of $N_2$ are discarded, which is equivalent to rounding the result to an integer by ignoring fraction digits.

Dividing by a power of two to calculate $N_3$ is an important feature of the present invention. Many low-power microcontrollers have a four-bit CPU which lacks an explicit division instruction. A program to carry out a long division operation can be created, but the program itself is long: on the order of fifty to eighty instruction steps if the instruction word length is eight bits and the data length is twelve bits. Such a long division program would use up a significant amount of valuable space in the microcontroller's program memory, leaving less room for application programs. Performing a seven-bit right shift, however, is comparatively easy; it can be programmed in about ten instruction steps. Execution speed is also faster.

Figure 6:
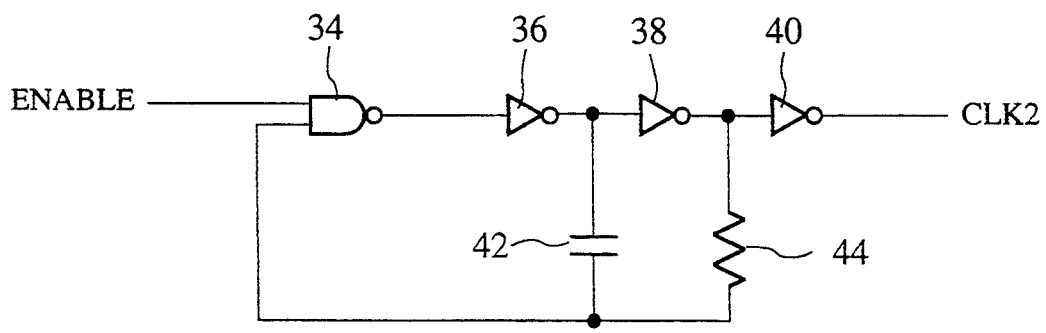
FIG. 6 is a schematic diagram of the second oscillator circuit in FIG. 1.

FIG. 6 shows one possible circuit configuration of the second oscillator 10, comprising a two-input NAND gate 34, to the output side of which three inverters 36, 38, and 40 are coupled in series. The NAND gate 34 receives the ENABLE signal at its first input. The output of the first inverter 36 is coupled through a capacitor 42 of capacitance C to the second input of the NAND gate 34. The output of the second inverter 38 is coupled through a resistor 44 of resistance R to the second input of the NAND gate 34. The CLK2 signal is output from the third inverter 40.

When ENABLE is low (inactive), the output of the NAND gate 34 is held at the high level, which is inverted by the three inverters 36, 38, and 40 to hold CLK2 at the low level. The second oscillator 10 is accordingly halted. The high output from the second inverter 38 charges the capacitor 42 through the resistor 44, making the second input to the NAND gate 34 high.

When ENABLE goes high (active), both inputs to the NAND gate 34 are high, so its output goes low and CLK2 goes high. The output of the second inverter 38, however, is now low, and it discharges the capacitor 42 through the resistor 44. This brings the second input of the NAND gate 34 to the low level, so its output changes to the high state, and CLK2 goes low again. The circuit continues to oscillate in this way with a frequency $f_2$ approximately equal to $\frac{1}{3}RC$.

It is difficult to control $f_2$ accurately in this circuit, partly because of the difficulty of fabricating resistors and capacitors with accurate values, and partly because of the sensitivity of R and C to temperature variations. The point of the invention, however, is that $f_2$ does not have to be precisely controlled; the microcontroller itself will measure $f_2$ (by counting $N_2$) and determine the necessary division ratio to produce a close approximation to $f_s$. An advantage of the circuit in FIG. 6 is that it is extremely inexpensive: all the circuit elements, including the resistor 44 and capacitor 42, can easily be integrated into the microcontroller chip; no external crystal or other external components are required.

The circuit in FIG. 6 is suitable for integration into a microcontroller of the complementary metal-oxide-semiconductor (CMOS) type. The invention is not restricted to this circuit, however; it can obviously be practiced with other oscillator circuits.

Figure 7:
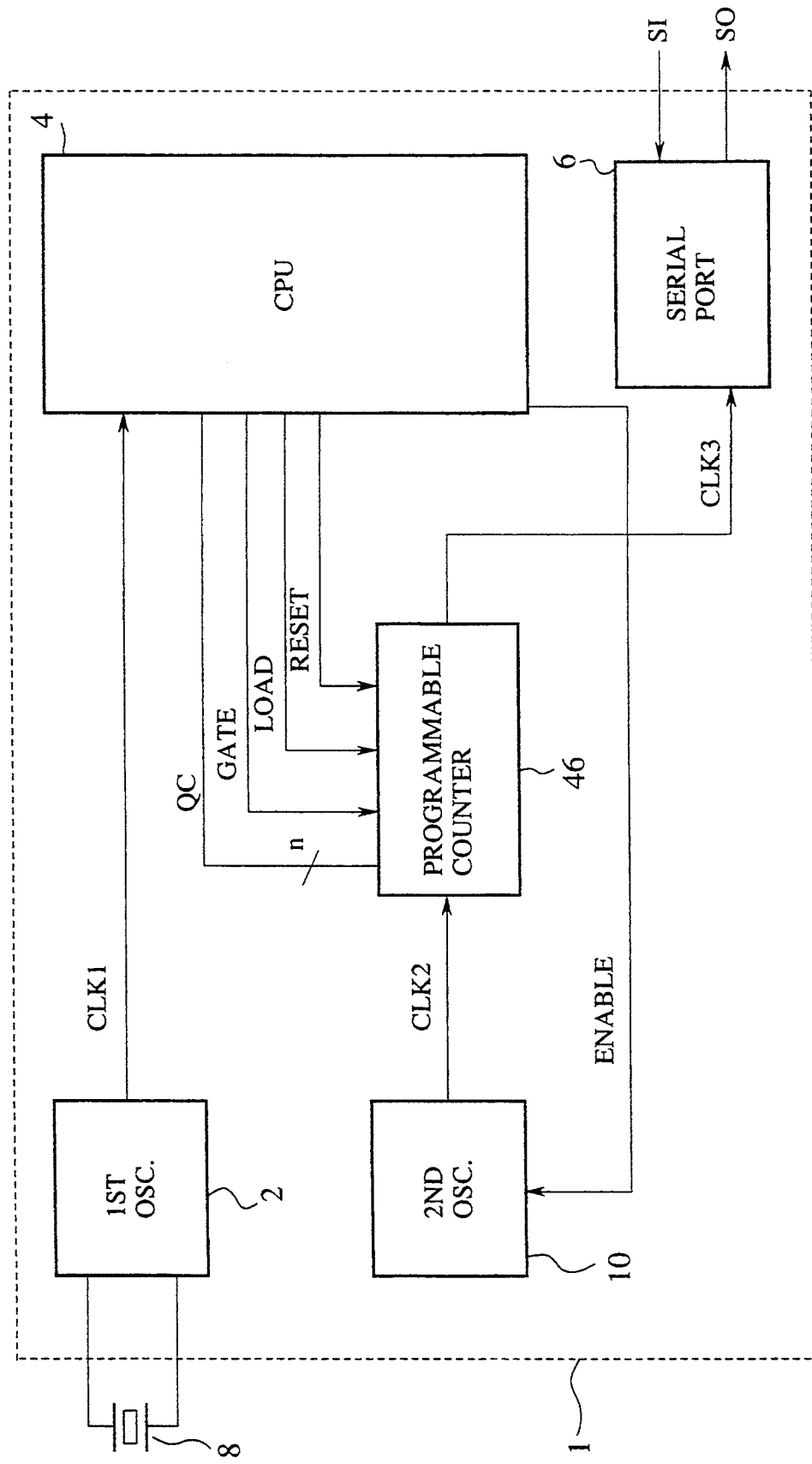
FIG. 7 is a block diagram illustrating a modification of the invented baud rate generator.

The programmable frequency divider 16 in FIG. 1 is a type of programmable counter. Since the second counter 14 and programmable frequency divider 16 do not have to operate at the same time, it is possible to replace both of them with a single programmable counter 46, as shown in FIG. 7. The programmable counter 46 is first programmed by signals from the CPU 4 to count CLK2 cycles, to obtain a count value $N_2$. Next, after the CPU 4 calculates $N_3$ from $N_2$, it programs the programmable counter 46 to divide CLK2 by $N_3$ and thereby generate the third clock signal CLK3. The CPU 4 uses a single n-bit signal line QC to read the count value $N_2$ from the programmable counter 46 and set the division ratio $N_3$ in the programmable counter 46.

The first counter 12 in FIG. 1 can be replaced by a timing program running in the CPU 4, so that the CPU 4 outputs the GATE signal, as also indicated in FIG. 7. For example, a program that counts 437 CLK1 cycles can be constructed by creating a loop that executes in fifteen cycles, executing this loop twenty-nine times, then executing an instruction that executes in two CLK1 cycles. If the first counter is implemented in software in this way, the baud rate generator can have a particularly simple structure, shown in FIG. 7, comprising only the second oscillator 10, the programmable counter 46, and the timing and calculation facilities provided by the first oscillator 2 and CPU 4.

The third clock signal CLK3 in the preceding description was a square-wave signal with a frequency substantially equal to the desired baud-rate frequency $f_s$ of 9600 Hz, but the invention is not restricted to this type of clock signal. For example, CLK3 can be a pulse signal with a frequency equal to a fixed multiple of the baud rate, which the serial port 6 divides to generate the baud rate. The baud rate can of course be other than 9600 bps. The frequency $f_1$ of the first clock signal can be other than 32,768 Hz. The integer $N_4$ used to calculate the division ratio need not be $2^7$ but can be some other power of two, or in general any positive integer, although powers of two are preferable. Higher values of $N_4$ enable the frequency $f_2$ of the second oscillator 10 to be measured with greater accuracy.

Although the invention has been described as part of a single-chip microcontroller, it can be applied in other devices as well. In place of the CPU 4 it can employ any processor unit capable of dividing $N_2$ by $N_4$ and generating the necessary control signals (e.g. ENABLE, LOAD, and RESET).

Those skilled in the art will recognize that many further modifications can be made in the drawings and descriptions above without departing from the scope of the invention as claimed below.

What is claimed is:

1. A method of generating a clock signal for serial communication from a first oscillator and a second oscillator, said first oscillator oscillating at a lower frequency than said second oscillator but with higher frequency accuracy, comprising the steps of:
   generating a first clock signal from said first oscillator;
   generating a second clock signal from said second oscillator;
   counting said first clock signal to determine an interval of time;
   counting said second clock signal during said interval of time to obtain a count value;
   dividing said count value by a certain integer to obtain a division ratio; and
   dividing said second clock signal in frequency by said division ratio, thereby generating said clock signal for serial communication.

2. The method of claim 1, wherein said first clock signal is a system clock signal of a microcontroller.

3. The method of claim 2, wherein said first oscillator employs a resonator external to said microcontroller.

4. The method of claim 2, wherein said second oscillator is internal to said microcontroller and employs no external resonator.

5. The method of claim 4, wherein said second oscillator is a resistor-capacitor oscillator.

6. The method of claim 1, wherein said integer is a power of two, and the step of dividing said count value is performed by a right shift operation.

7. The method of claim 1, comprising the further steps of:
   activating said second oscillator when serial communication is required;
   waiting for said second clock signal to stabilize before starting to count said first clock signal to determine said interval of time; and
   halting said second oscillator when serial communication is not required.

8. A baud rate generator for generating a clock signal for serial communication, comprising:
   a first oscillator for generating a first clock signal;
   a second oscillator for generating a second clock signal;
   a first counter coupled to count said first clock signal, to thereby determine an interval of time, and output a gate signal that is active only during said interval;
   a second counter coupled to count said second clock signal while said gate signal is active, thereby generating a count value;
   a programmable frequency divider coupled to divide said second clock signal by a division ratio, thereby generating said clock signal for serial communication; and
   a processor unit coupled to read said count value from said second counter, divide said count value by a certain integer, thereby calculating said division ratio, and load said division ratio into said programmable frequency divider.

9. The baud rate generator of claim 8, wherein said baud rate generator, is fabricated as part of a microcontroller, said processor unit being a central processing unit of the microcontroller.

10. The baud rate generator of claim 9, wherein said microcontroller uses said first clock signal as a system clock signal.

11. The baud rate generator of claim 8, wherein said processor unit generates an enable signal that activates said second oscillator when serial communication is required and halts said second oscillator at other times.

12. The baud rate generator of claim 8, wherein said processor unit generates a reset signal that resets said first counter and said second counter.

13. The baud rate generator of claim 8, wherein said integer is a power of two, and said processor unit is programmed to divide said count value by said integer by performing a right shift operation.

14. The baud rate generator of claim 8, wherein said second oscillator is a resistor-capacitor oscillator.

15. The baud rate generator of claim 14, wherein said second oscillator comprises:
   a logic gate having a first input terminal, a second input terminal, and an output terminal;
   a plurality of inverters coupled in series to said output terminal;
   a capacitor for coupling an output of one of said inverters to said second input terminal; and
   a resistor for coupling an output of another of said inverters to said second input terminal.

16. The baud rate generator of claim 15, wherein said logic gate is a NAND gate.

17. The baud rate generator of claim 15, wherein said first input terminal receives an enable signal from said processor unit.

18. The baud rate generator of claim 8, wherein said second counter and said programmable frequency divider are combined as a single programmable counter.

19. The baud rate generator of claim 8, wherein said first counter comprises a timing program running on said processor unit, said gate signal being output from said processor unit.

20. A baud rate generator for generating a clock signal for serial communication, comprising:
   a first oscillator for generating a first clock signal;
   a second oscillator for generating a second clock signal;
   a programmable counter coupled to count said second clock signal during a certain interval of time, thereby generating a count value, and to divide said second clock signal by a division ratio, thereby generating said clock signal for serial communication; and
   a processor unit coupled to count said first clock signal, thereby determining said interval of time, to read said count value from said programmable counter, to divide said count value by a certain integer, thereby calculating said division ratio, and to load said division ratio into said programmable counter.

21. The baud rate generator of claim 20, wherein said baud rate generator is fabricated as part of a microcontroller, said processor unit being a central processing unit of the microcontroller.

22. The baud rate generator of claim 21, wherein said microcontroller uses said first clock signal as a system clock signal.

23. The baud rate generator of claim 20, wherein said processor unit generates an enable signal that activates said second oscillator when serial communication is required and halts said second oscillator at other times.

24. The baud rate generator of claim 20, wherein said processor unit generates a reset signal that resets said programmable counter.

25. The baud rate generator of claim 20, wherein said integer is a power of two, and said processor unit is programmed to divide said count value by said integer by performing a right shift operation.

26. The baud rate generator of claim 20, wherein said second oscillator is a resistor-capacitor oscillator.

27. The baud rate generator of claim 26, wherein said second oscillator comprises:
- a logic gate having a first input terminal, a second input terminal, and an output terminal;
- a plurality of inverters coupled in series to said output terminal;
- a capacitor for coupling an output of one of said inverters to said second input terminal; and
- a resistor for coupling an output of another of said inverters to said second input terminal.

28. The baud rate generator of claim 27, wherein said logic gate is a NAND gate.

29. The baud rate generator of claim 27, wherein said first input terminal receives an enable signal from said processor unit.

* * * * *